No. 619,436. Patented Feb. 14, 1899.
A. POEFFEL.
INCANDESCENT PETROLEUM LAMP.
(Application filed Jan. 19, 1898.)
(No Model.)
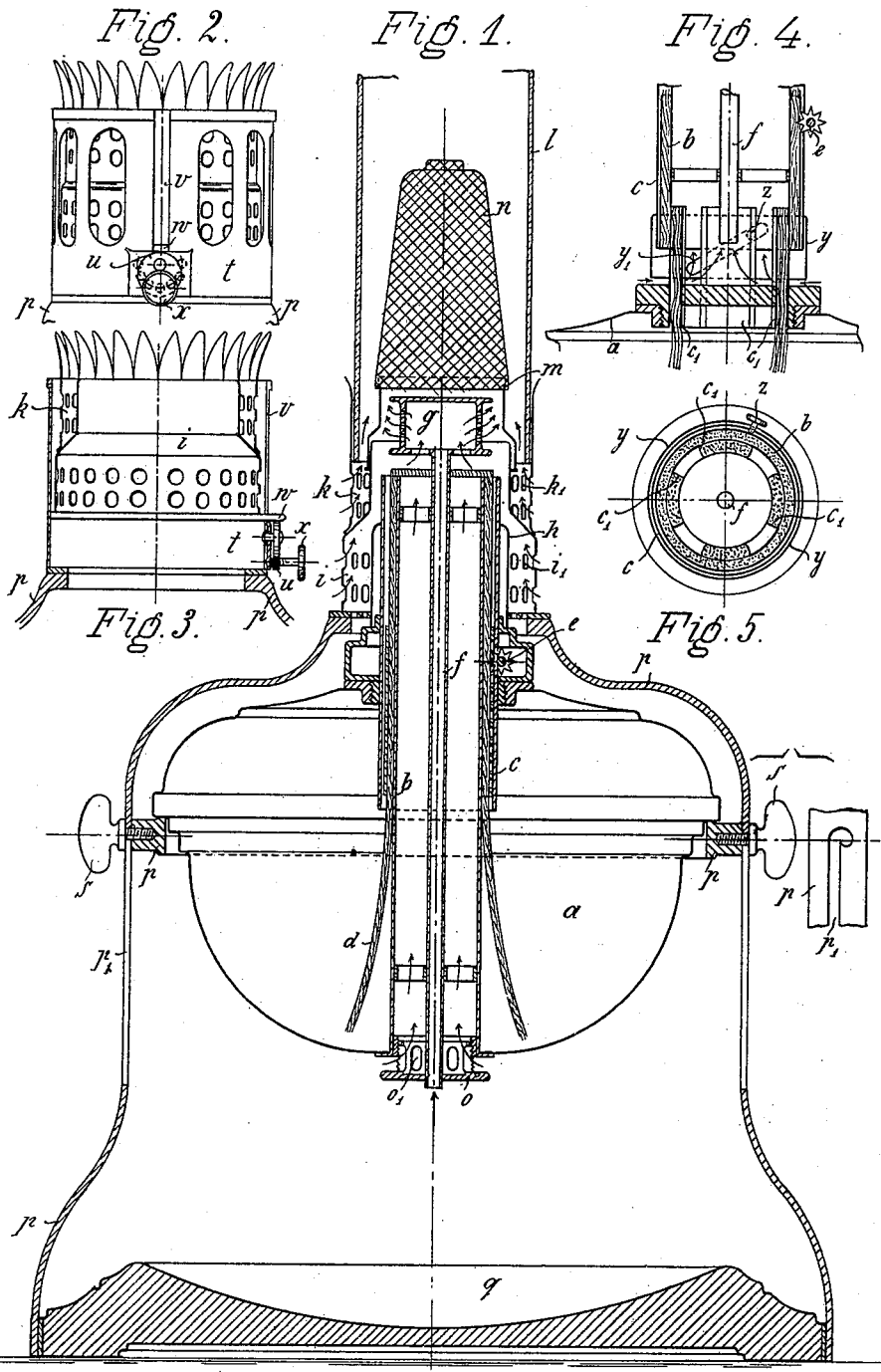

UNITED STATES PATENT OFFICE.

ARTHUR POEFFEL, OF VIENNA, AUSTRIA-HUNGARY.

INCANDESCENT PETROLEUM-LAMP.

SPECIFICATION forming part of Letters Patent No. 619,436, dated February 14, 1899.

Application filed January 19, 1898. Serial No. 667,162. (No model.)

*To all whom it may concern:*

Be it known that I, ARTHUR POEFFEL, a subject of the Emperor of Austria-Hungary, residing at Vienna, Austria-Hungary, have invented certain new and useful Improvements in Incandescent Petroleum-Lamps, of which the following is a specification.

My invention has relation to an incandescent petroleum-lamp of the type or class wherein a mantle or hood of suitable material is made incandescent by subjecting it to the flame from the wick of the lamp, which flame prior thereto has been mixed with oxygen; and in such connection it relates to the construction and arrangement of such a lamp.

The principal objects of my invention are, first, to provide an incandescent petroleum-lamp having a tubular wick with or without a central air-opening and so arranged that the flame of the ignited wick shall be intimately mixed with oxygen prior to its contact with the incandescing mantle; second, to provide in such a lamp means for regulating the admission of oxygen to the flame, and, third, to provide in such a lamp a wick and its accessories so arranged that the wick may be ignited without removing or disturbing the mantle.

My invention, stated in general terms, consists of an incandescent petroleum-lamp constructed and arranged in substantially the manner hereinafter described and claimed.

The nature and scope of my invention will be more fully understood from the following description, taken in connection with the accompanying drawings, forming part hereof, in which—

Figure 1 is a vertical central section of a lamp embodying main features of my invention, the mantle being shown in side elevation. Fig. 2 is a side elevational view, enlarged, of the burner-frame removed from the lamp and illustrating the means, not shown in Fig. 1, for regulating the height of the mantle. Fig. 3 is a vertical sectional view of Fig. 2. Fig. 4 is a vertical sectional view, enlarged, of a modified form of burner-frame wherein the wick proper has no central air or oxygen opening; and Fig. 5 is a cross-sectional view of Fig. 4.

Referring to the drawings, $a$ represents the reservoir of the lamp, preferably supported in a frame or standard $p$. Through the petroleum-reservoir $a$ extends a central tube $b$, serving, in connection with the tube $c$, to maintain and guide the tubular wick $d$. Known means $e$ are provided for manually adjusting the wick to or from the upper annular opening formed between the tubes $b$ and $c$. In this air or oxygen admission tube $b$ is fixed centrally a smaller tube $f$, open at its base and provided on its upper end, which extends through the upper end of tubes $b$ and $c$, with an enlarged hollow body $g$, the peripheral wall of which is perforated like a sieve. This body $g$ serves as a mixing-chamber and as a flame-distributer and gasifier or gas-reducer. A tube $h$, with an inwardly-curved upper end, surrounds said tube $c$ and the burner-frame $i$, of an irregular shape, which is peripherally provided with apertures $i'$, surrounding the said tube $h$. The irregular form of the burner-frame $i$ permits of the reducing of the space between the tube $h$ and the burner $i$ for the admission of oxygen to the flame. A chimney-rest $k$, which is also provided with apertures $k'$, is fixed to said burner-frame $i$ and receives the chimney $l$. Upon the upper rim of the burner $i$ is provided a hood $m$, on which is supported the incandescent mantle $n$.

The action of the burner, as hereinbefore described, is as follows: After having ignited the wick there will follow the admission of oxygen through the tubes $b$ and $f$ and the apertures $i'$ and $k'$. The oxygen passing through the tube $b$ retards the consumption of the wick, which is consumed only in an incomplete manner on its inner border, and this oxygen also serves to direct the gases and the flame to the hollow body $g$, where they are completely mixed with the oxygen entering from below through the pipe or tube $f$. In this manner the gases and the flame escaping through the apertures of the body $g$ are completely and intimately mixed and after having received through the apertures $i'$ the required supplementary oxygen are presented to the mantle $n$. The stream of oxygen passing through the tube $b$ will cause the flame to be adapted exactly to the form and position of the incandescent mantle. In addition the oxygen entering through the apertures $k'$ of the cylinder-holder $k$ will cause a complete combustion of the gases, and hence the highest lighting effect will be given to the flame. The regulating of the admission of oxygen through the tubes $b$ and $f$ is essentially necessary for the perfect burning of the lamp, and it is apparent that by means of the variation or diminution of the entering-space the intensity of the oxygen admission may be increased by the enlargement of the oxygen-draft. This can be obtained in several ways—preferably, for instance, by employing a screw $o$, which permits the lower opening of the tube $b$ to close more or less, according as the apertures $o'$ enter into the tube $b$.

To permit the mantle-holding frame to be readily separable from the lamp-reservoir, the chimney-rest $k$ and the burner $i$ are fixed to the lamp-base $p$ and $q$, and the petroleum-reservoir is placed in a ring $r$ and clamped by set-screws $s$ to the base $p$. The screws when loosened are adapted to slide with the supporting-ring $r$ downward in the slots $p'$, provided in the base $p$.

For filling the reservoir or for igniting the lamp the screws are loosened and the reservoir lowered till the screws reach the end of the slots $p'$. This being done and after the filling of the reservoir it can be replaced and fixed in position by tightening the screws $s$. It is necessary that the mixing room or body $g$, as well as the entire burner, be placed in an immovable position with respect to the incandescent mantle, and hence the following special arrangement is preferably provided. As shown in Figs. 2 and 3, the hood or mantle rest $m$ is inserted, with the burner-frames $i$ and $k$, in a special tube $t$, which is also fixed to the lamp-base $p$ and $q$. The tube $t$ is provided with a series of apertures for the admission of air to the burner.

The exact position of the mantle-bearing hood $m$ and the burner-frames $i$ and $k$ is obtained by means of an eccentric $u$, sliding with its axis in a slot $v$ of the tube $t$. The burner-frame $i$ is fixed upon a plate, which has an arm $w$ extending through the slot $v$, by which means the frame $i$ is prevented from side movement; but it can be regulated in its upward direction by the action of the eccentric $u$, which remains under the said arm $w$. The position of the latter is maintained by a screw $x$, which presses the eccentric against the tube $t$.

In the modification illustrated in Figs. 4 and 5 means are provided whereby the invention is adapted for use with lamps the wick of which is without a central oxygen-admission tube. In this instance the burner-frame $c'$ is surrounded by a tube $c$. The tube $c$ receives a socket $y$, which is provided with a specially-formed sloping groove $y'$, in which moves a stud $z$, fixed upon the burner-frame. By turning this stud in the said groove the socket $y$ will move up and down and will cover more or less of the apertures in the tube $c$ and regulate the admission of oxygen to the flame. The said tube $c$ serves not only as a guide for the socket, but also advantageously and simultaneously for the feeding of the burning wick with oil by the intervention of the sucking-wick.

Having thus described the nature and objects of my invention, what I claim as new, and desire to secure by Letters Patent, is—

1. In a lamp of the character described, a tubular wick, an internal oxygen-tube surrounded by said wick, an auxiliary oxygen-tube arranged centrally in the internal oxygen-tube and projecting beyond the upper end of the wick, a hollow body having the peripheral wall perforated and supported by and in open communication with the auxiliary oxygen-tube, said body located adjacent to and adapted to receive the flame from the wick, a slotted screw adapted to be advanced in the internal oxygen-tube to regulate the admission of air thereto, and an incandescing mantle supported above the hollow body, substantially as and for the purposes described.

2. In a lamp of the character described, a vertically-slotted base, a burner and an incandescent mantle directly supported by said base, a lamp-body, a ring supporting said lamp-body and set-screws adapted to clamp the ring to the base, said ring, lamp-body and set-screws adapted to slide vertically in the slotted base, substantially as and for the purposes described.

In testimony whereof I have hereunto set my hand in the presence of two witnesses.

ARTHUR POEFFEL.

Witnesses:
HENRY C. CARPENTER,
CHAS. E. CARPENTER.